US012493265B2

(12) United States Patent
Ejiri et al.

(10) Patent No.: US 12,493,265 B2
(45) Date of Patent: Dec. 9, 2025

(54) HAIRSPRING, TIMEPIECE MOVEMENT, AND TIMEPIECE

(71) Applicant: SEIKO WATCH KABUSHIKI KAISHA (trading as SEIKO WATCH CORPORATION), Tokyo (JP)

(72) Inventors: Tomokazu Ejiri, Chiba (JP); Terutaka Sugiyama, Chiba (JP); Naoki Amano, Chiba (JP); Jun Tsuneyoshi, Chiba (JP)

(73) Assignee: Seiko Watch Kabushiki Kaisha (Trading as Seiko Watch Corporation), Tokyo (JP)

( * ) Notice: Subject to any disclaimer, the term of this patent is extended or adjusted under 35 U.S.C. 154(b) by 364 days.

(21) Appl. No.: 18/180,347

(22) Filed: Mar. 8, 2023

(65) Prior Publication Data

US 2023/0305493 A1 Sep. 28, 2023

(30) Foreign Application Priority Data

Mar. 14, 2022 (JP) ................................ 2022-039214
Jan. 11, 2023 (JP) ................................ 2023-002724

(51) Int. Cl.
*G04B 17/06* (2006.01)
*G04B 17/32* (2006.01)

(52) U.S. Cl.
CPC ............ *G04B 17/06* (2013.01); *G04B 17/32* (2013.01)

(58) Field of Classification Search
CPC ...... G04B 17/06; G04B 17/32; G04B 17/227; G04B 17/222; C22C 27/02
See application file for complete search history.

(56) References Cited

U.S. PATENT DOCUMENTS 5,881,026 A 3/1999 Baur et al.
2007/0020136 A1* 1/2007 Menon .................... C22C 27/02 420/426
2015/0344993 A1* 12/2015 Derrig ...................... A44C 9/00 420/431
2017/0250554 A1* 8/2017 Tajima ................. A44C 5/0053

FOREIGN PATENT DOCUMENTS

CN 104583880 B * 7/2018 ............. C23C 16/34
EP 3663867 A1 * 6/2020 ........... G04B 17/227
WO WO-2016093354 A1 * 6/2016 ........... G04B 17/063

* cited by examiner

*Primary Examiner* — Regis J Betsch
*Assistant Examiner* — Kevin Andrew Johnston
(74) *Attorney, Agent, or Firm* — Crowell & Moring LLP

(57) ABSTRACT

An object of the present invention is to provide a hairspring, a timepiece movement, and a timepiece. A hairspring according to the present invention is characterized by being made of a Nb—Mo alloy containing 5% or more and 14% or less of Mo in at %. Alternatively, a hairspring according to the present invention is characterized by being made of a Nb—Mo alloy containing 5% or more and 14% or less of Mo in at %, inevitable impurities and balance Nb. It is preferable that the hairspring has a deformation texture and a region having a <110>||{001} orientation degree in a cross section is 30% or more of an entire cross-sectional area.

12 Claims, 15 Drawing Sheets

0 sec 24 sec 48 sec 72 sec

HAIRSPRING, TIMEPIECE MOVEMENT, AND TIMEPIECE

RELATED APPLICATIONS

This application claims priority to Japanese Patent Application No. 2022-039214 filed on Mar. 14, 2022, and JP2023-002724 filed on Jan. 11, 2023, the entire contents of which are incorporated herein by reference.

BACKGROUND OF THE INVENTION

1. Field of the Invention

The present invention relates to a hairspring, a timepiece movement, and a timepiece.

2. Description of the Related Art

It has been known that, in a mechanical timepiece including a hairspring as an oscillation source, time accuracy changes, that is, a rate (a degree of delay or advance of a timepiece) changes because of external factors such as temperature, posture, and oscillation.

For example, accuracy of the mechanical timepiece depends on stability of a specific frequency of a hairspring assembly oscillator. That is, when a temperature change occurs, the specific frequency of the assembly oscillator changes and the accuracy of the timepiece becomes unstable because of changes in thermal expansion of the hairspring and a balance wheel and a Young's modulus of the hairspring.

In the assembly oscillator of the mechanical timepiece, for the purpose of reducing a change in the specific frequency due to temperature, a niobium base alloy having a low thermal expansion ratio added with zirconium or molybdenum has been known as a metal material configuring the hairspring.

For example, EP3663867A described below describes a technique for predicting a temperature characteristic of a Young's modulus of a Nb—Mo alloy with a computer simulation.

JPH11-071625A described below discloses a technique for realizing, concerning a hairspring manufactured from a Nb—Zr alloy, causing the hairspring to contain 500 mass ppm or more of interstitial dope elements including oxygen and controlling a precipitation amount of a Zr concentrated phase to realize any temperature characteristic.

According to the technique described in EP3663867A, it is predicted that a target temperature coefficient of elasticity is obtained in a Nb—Mo alloy obtained by adding Mo to Nb in a range of 15% to 50%.

However, in the technique described in EP3663867A, a hairspring made of the Nb—Mo alloy is not actually manufactured to measure the Young's modulus. The Young's modulus is an estimation result by a result of a first principle calculation. Therefore, because of, for example, the influence of processing strain or the like, it is unclear whether a calculated value and a measured value correspond when the Nb—Mo alloy is actually used as a hairspring. There is an unclear problem in practicality.

According to the technique described in EP3663867A, it is necessary to adjust a residual strain amount in relation to a processing rate and a thermal processing temperature of the Nb—Mo alloy. Further, it is necessary to adjust a <110> orientation degree of a crystal.

Therefore, it is considered not easy to apply the Nb—Mo alloy to the hairspring and realize a target temperature characteristic.

In the technique described in JPH11-071625A, since it is necessary to precisely control an oxygen content of an alloy, it is considered not easy to manufacture the alloy.

SUMMARY OF THE INVENTION

It is an aspect of the present application to provide a hairspring, a timepiece movement, and a timepiece that make it unnecessary to adjust a temperature coefficient of elasticity (TCE) by oxygen concentration by using a Nb—Mo base alloy having a special composition not known in the past and are capable of adjusting a TCE considering actual processing.

It is another aspect of the present application to provide a technique that can eliminate a change in a rate over time considered to occur when the hairspring is configured using the Nb—Mo alloy explained above.

(1) A hairspring according to the present application is characterized by being made of a Nb—Mo alloy containing 5% or more and 14% or less of Mo in at %.

Since the Nb—Mo alloy containing the 5% or more and 14% or less of Mo in at % contains the Mo as a second element in a suitable range, it is possible to obtain a hairspring that does not need to adjust a TCE by oxygen concentration and has a TCE adjusted to a target low range by adjusting a Mo content, a deformation texture, and a residual strain amount. That is, with the hairspring according to the present application, it is possible to provide a hairspring that does not need to adjust the oxygen concentration and is capable of controlling the TCE to a target range while considering actual processing in forming the hairspring.

(2) A hairspring according to the present application is characterized by being made of a Nb—Mo alloy containing 5% or more and 14% or less of Mo in at % and made of a balance inevitable impurity and Nb.

Since the Nb—Mo alloy containing the 5% or more and 14% or less of Mo in at % and made of the balance inevitable impurity and the Nb contains Mo as a second element in a suitable range, it is possible to obtain a hairspring that does not need to adjust a TCE by oxygen concentration and has a TCE adjusted to a target low range by adjusting an Mo content, a deformation texture, and a residual strain amount. That is, with the hairspring according to the present application, it is possible to provide a hairspring that does not need to adjust the oxygen concentration and is capable of controlling the TCE to a target range while considering actual processing in forming the hairspring.

(3) In the hairspring according to the present application, it is preferable that the hairspring has a deformation texture and a region having a <110>||{001} orientation degree in a cross section is 30% or more of an entire cross-sectional area.

It is possible to provide a hairspring capable of adjusting a TCE with the deformation texture and capable of adjusting the TCE considering actual processing in manufacturing the hairspring by generation of the deformation texture having the <110>||{001} orientation degree in addition to the regulation of the Mo content explained above.

(4) In the hairspring according to the present application, it is preferable that an average KAM value is 1.0 to 4.0.

It is possible to provide a hairspring capable of adjusting a TCE with the average KAM value in addition to the Mo content and the deformation texture.

(5) In the hairspring according to any one of (1) to (4) of the present application, it is preferable that the hairspring includes a base material and a first oxide coating film layer and a second oxide coating film layer that cover the base material, the base material is made of the Nb—Mo alloy, the first oxide coating film layer includes Nb, Mo, and O, and the second oxide coating film layer includes Nb and O.

The Nb—Mo alloy configuring the hairspring easily generates a passive film in the air with natural oxidation over time and, because of the influence of the passive film, when the hairspring is used in the air over time, the hairspring causes a change with time of a rate.

If the hairspring includes not the passive film caused by the natural oxidation over time in the air but the first oxide coating film layer and the second oxide coating film layer formed by oxidation treatment in advance, the change with time of the rate hardly occurs. Therefore, when a timepiece is configured using the hairspring including the first oxide coating film layer and the second oxide coating film layer, it is possible to provide a timepiece with high accuracy.

(6) A timepiece movement according to the present application is characterized by including the hairspring described in any one of (1) to (5), a balance staff, a balance wheel, and a balance with hairspring.

With the timepiece movement including the hairspring explained above, it is possible to provide a timepiece movement that is capable of adjusting a TCE of the hairspring to be small in a desirable range, aligns a specific frequency of an assembly oscillator, has a small change in a rate, has high accuracy, and is stable.

When the hairspring including the first oxide coating film layer and the second oxide coating film layer is adopted, it is possible to provide a timepiece movement that does not cause a change in a rate due to a change with time and is stable.

(7) A timepiece according to the present application is characterized by including the timepiece movement described in (6).

With the timepiece including the timepiece movement explained above, it is possible to provide a timepiece that includes a hairspring having a TCE in a desirable range, aligns a specific frequency of an assembly oscillator, has a small change in a rate, and has high accuracy.

When the timepiece movement including the hairspring including the first oxide coating film layer and the second oxide coating film layer is adopted, it is possible to provide a timepiece that does not cause a change in a rate due to a change with time and is stable.

The present application is a hairspring made of a Nb—Mo alloy obtained by adding 5 at % or more and 14 at % or less of Mo to Nb as a second element. It is possible to provide a hairspring that is capable of adjusting a TCE considering actual processing such as wire drawing and makes it possible to adjust the TCE to a desirable range through optimization of a deformation texture and a residual strain amount.

The hairspring according to the present application has a characteristic in that an orientation degree of the deformation texture is high, a wide range can be adopted for a KAM value, and adjustment of the TCE by oxygen concentration is unnecessary and it is easy to manufacture the hairspring.

The hairspring of the present application has a characteristic that it is possible to adjust the TCE to any TCE through a combination of a Mo content, control of the deformation texture, and control of the KAM value and the residual strain amount. By adopting the hairspring including the first oxide coating film layer and the second oxide coating film layer, it is possible to prevent a change with time of a rate from occurring.

Therefore, with a timepiece movement or a timepiece using the hairspring of the present application, there is an effect that it is possible to provide a timepiece movement and a timepiece that have a small change with time of a rate and have high accuracy.

DETAILED DESCRIPTION OF THE PREFERRED EMBODIMENTS

Figure 1:
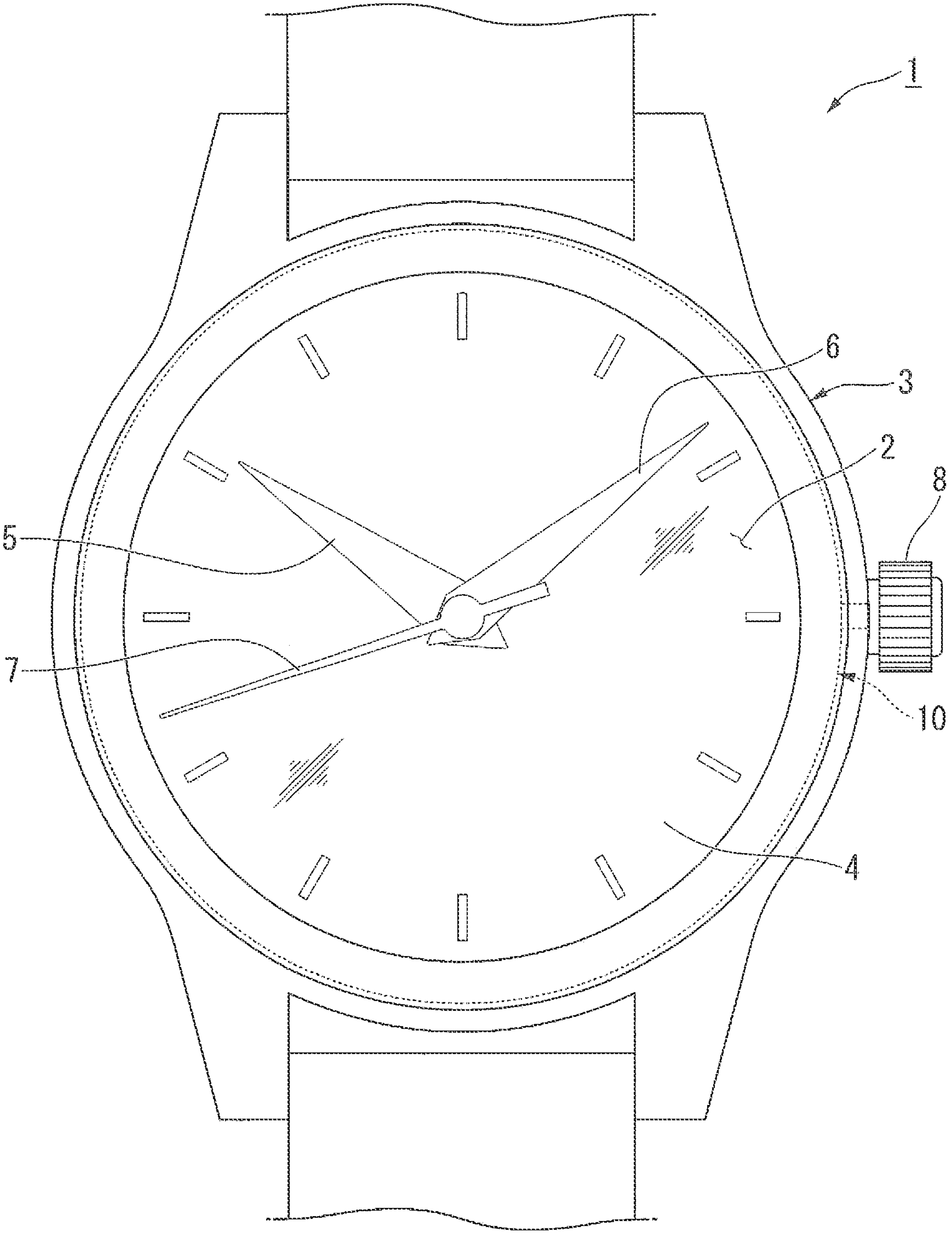
FIG. 1 is an exterior view showing a first embodiment of a timepiece according to the present invention.

An embodiment according to the present invention is explained below with reference to the drawings. Note that, in this embodiment, a mechanical timepiece is explained as an example of a timepiece. In the drawings, scales of components are changed as appropriate to show the components in recognizable sizes.

<Configuration of a Timepiece in a First Embodiment>

In general, a machine body including a driving portion of a timepiece is called "movement". A state in which a dial and hands are attached to the movement and put in a timepiece case to form a completed product is called "complete" of the timepiece. Of both sides of a main plate configuring a board of the timepiece, a side where glass of the timepiece case is present (a side where the dial is present) is called "rear side" of the movement. Of both the sides of the main plate, a side where a case back of the timepiece case is present (a side opposite to the dial) is called "front side" of the movement.

As shown in FIG. 1, a complete of a timepiece 1 in the first embodiment includes, in a timepiece case 3 made of a not-shown case back and glass 2, a movement (the timepiece movement according to the present invention) 10, a dial 4 having indicators (time characters) indicating information concerning at least time, and hands including a hour hand 5 indicating an hour, a minute hand 6 indicating a minute, and a second hand 7 indicating a second.

Figure 2:
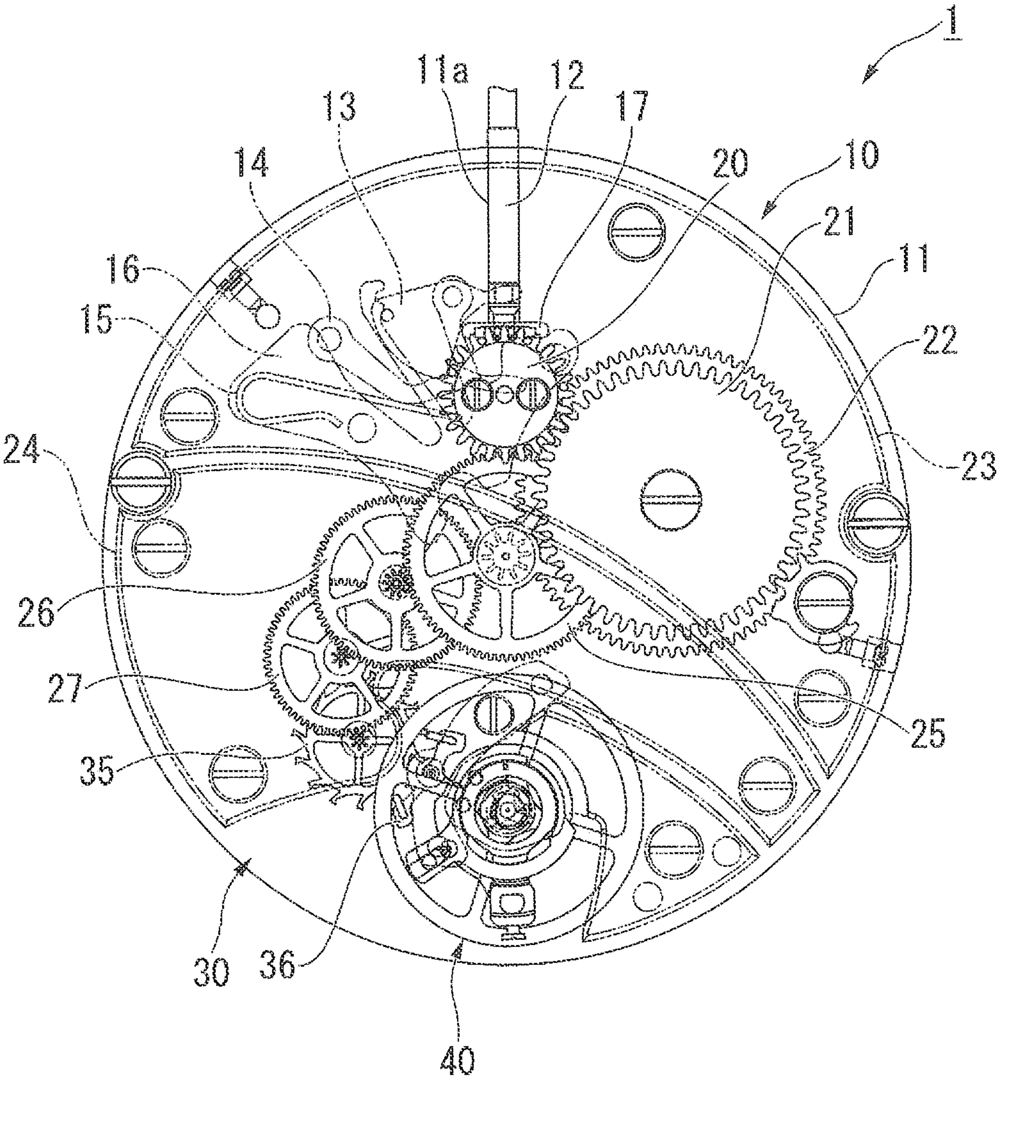
FIG. 2 is a plan view of a timepiece movement provided in the timepiece in the first embodiment.

As shown in FIG. 2, the movement 10 includes a main plate 11 configuring a board. Note that, in FIG. 2, illustration of a part of components configuring the movement is omitted to clearly show the drawing.

A setting stem guide hole 11*a* is formed in the main plate 11. A setting stem 12 coupled to a crown 8 shown in FIG. 1 is rotatably incorporated in the setting stem guide hole 11*a*. The setting stem 12 is positioned in an axial direction by a switching device including a setting lever 13, a yoke 14, a yoke spring 15, and a setting lever jumper 16. Note that a winding pinion 17 is rotatably provided in a guide shaft section of the setting stem 12.

When the setting stem 12 is rotated in such a configuration, the winding pinion 17 rotates via rotation of a not-shown clutch wheel. When the winding pinion 17 rotates, a crown wheel 20 and a ratchet wheel 21 rotate in order according to the rotation of the winding pinion 17. A not-shown mainspring (a power source) housed in a movement barrel complete 22 is wound up. Note that the movement barrel complete 22 is axially supported between the main plate 11 and a barrel bridge 23.

A center wheel and pinion 25, a third wheel and pinion 26, a fourth wheel and pinion 27, and an escape wheel and pinion 35 are axially supported between the main plate 11 and a train wheel bridge 24. The center wheel pinion 25, the third wheel and pinion 26, and the fourth wheel and pinion 27 are configured to rotate in order when the movement barrel complete 22 rotates with a restoration force of the mainspring. The movement barrel complete 22, the center wheel and pinion 25, the third wheel and pinion 26, and the fourth wheel and pinion 27 configure a front train wheel.

Note that, when the center wheel and pinion 25 rotates, a not-shown cannon pinion rotates based on the rotation. The minute hand 6 shown in FIG. 1 attached to the canon pinion displays "minute". When the cannon pinion rotates, a not-shown hour wheel rotates via a not-shown minute wheel. The hour hand 5 shown in FIG. 1 attached to the hour wheel displays "hour". When the fourth wheel and pinion 27 rotates, the second hand 7 shown in FIG. 1 attached to the fourth wheel and pinion 27 displays "second".

On a front side of the movement 10, an escapement/speed control mechanism 30 for controlling the rotation of the front train wheel is disposed.

The escapement/speed control mechanism 30 includes the escape wheel and pinion 35 meshed with the fourth wheel and pinion 27, a pallet fork 36 that causes the escape wheel and pinion 35 to escape and regularly rotate, and a balance with hairspring 40. The structure of the balance with hairspring 40 is explained in detail below.

(Configuration of the Balance with Hairspring)

Figure 3:
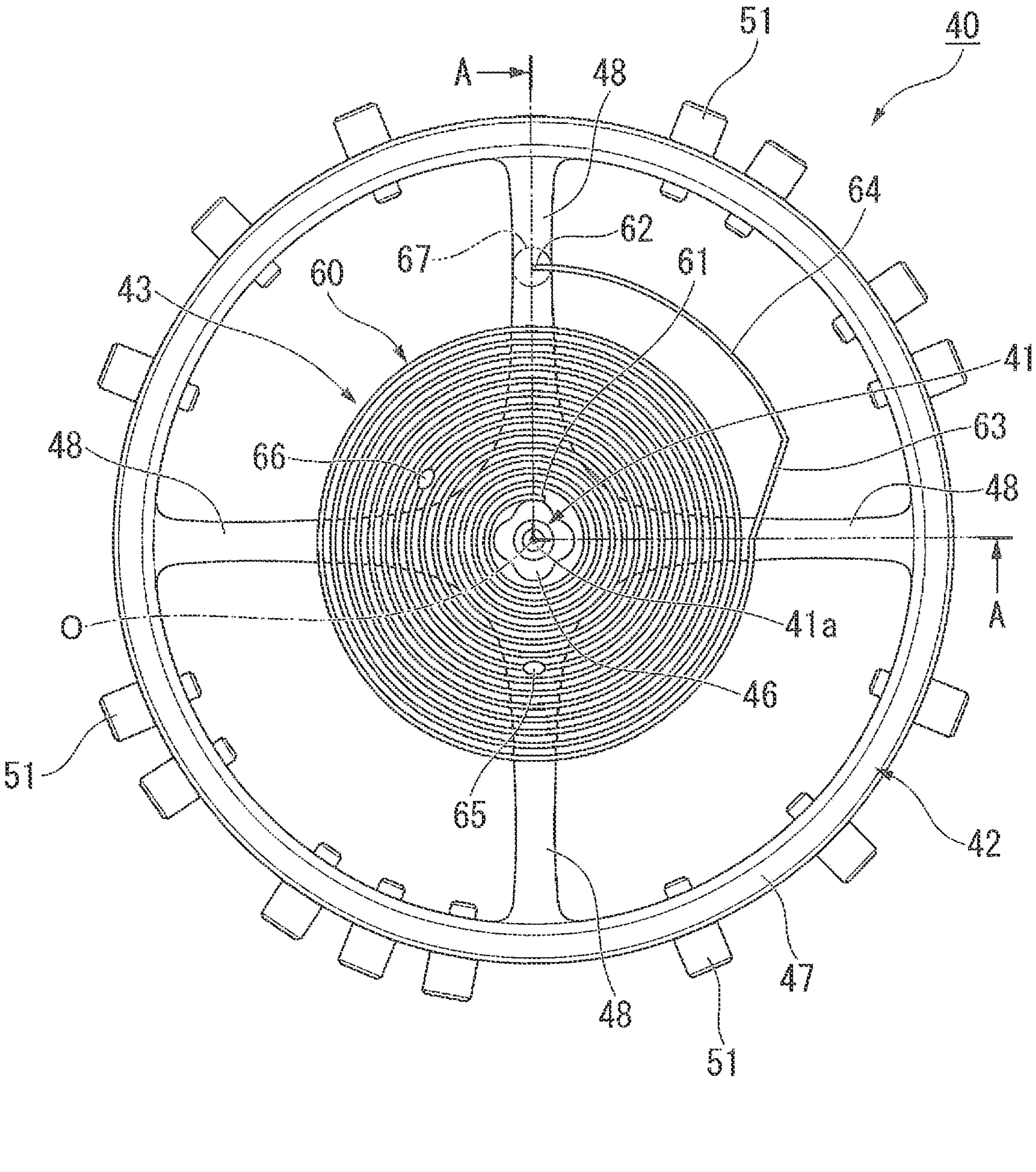
FIG. 3 is a plan view showing an example of a balance with hairspring provided in the timepiece movement shown in FIG. 2.

As shown in FIG. 3, the balance with hairspring 40 includes a balance staff 41, a balance wheel 42, and a hairspring 43 and reciprocatingly rotates (normally and reversely rotates) at a fixed oscillation cycle (oscillation angle) around a center axis O of the balance staff 41 using power of the hairspring 43.

Note that, in this embodiment, a direction orthogonal to the center axis O of the balance staff 41 can be referred to as radial direction and a direction around the center axis O in a plan view from the center axis O direction can be referred to as peripheral direction.

The balance staff 41 is formed as a bar-like member formed of metal such as brass and extending along the center axis O. A tapered first tenon 41*a* and a tapered second tenon 41*b* are formed at both the ends in the axial direction of the balance staff 41.

The balance staff 41 is axially supported between the main plate 11 and a not-shown balance bridge, via the first tenon 41*a* and the second tenon 41*b*. A substantially center portion in the axial direction of the balance staff 41 is fixed in a fitting hole 50 explained below of the balance wheel 42 by, for example, press fitting. Consequently, the balance staff 41 and the balance wheel 42 are integrally fixed.

In the balance staff 41, an annular swing spacer 44 is externally fit coaxially with the center axis O in a portion located closer to the second tenon 41*b* than the balance wheel 42. The swing spacer 44 includes a flange section 44*a* protruding toward the outer side in the radial direction. A swing jewel 45 for swinging the pallet fork 36 is fixed to the flange section 44*a*.

Further, in the balance staff 41, an annular collet 46 for fixing the hairspring 43 is externally fit coaxially with the center axis O in a portion located closer to the first tenon 41*a* than the balance wheel 42.

The balance wheel 42 includes an annular rim section 47 disposed coaxially with the center axis O and surrounding the balance staff 41 from the outer side in the radial direction and an arm section 48 that couples the rim section 47 and the balance staff 41 in the radial direction.

The rim section 47 is formed of metal such as brass. A plurality of arm sections 48 extend in the radial direction and are disposed at intervals in the peripheral direction. In the illustrated example, four arm sections 48 are disposed at intervals of 90 degrees centering on the center axis O. However, the number, the disposition, and the shape of the arm sections 48 are not limited to this case.

The outer end portions in the radial direction of the arm sections 48 are integrally coupled to the inner peripheral portion of the rim section 47. The inner end portions in the radial direction of the arm sections 48 are connected to one another and integrated. A fitting hole 50 disposed coaxially with the center axis O is formed in a coupling section 49 integrated with the inner end portions of the arm sections 48. As explained above, the balance staff 41 is fixed in the fitting hole 50 by, for example, press fitting.

Further, an adjustment screw (an adjusting section) 51 for adjusting a mass balance around the center axis O of the entire balance with hairspring 40 including the hairspring 43 and the balance wheel 42 is attached to the rim section 47.

A plurality of adjustment screws 51 are disposed at intervals in the peripheral direction and are screwed to the rim section 47, for example, from the outer side in the radial direction. By performing adjustment for, for example, detaching one or a plurality of adjustment screws 51, it is possible to adjust the mass balance around the center axis O and it is possible to reduce so-called off-center weight (mass imbalance).

Note that the adjusting section for adjusting the mass balance is not limited to the adjustment screw 51. For example, a film body, which is easily cut, may be formed on the surface (the upper surface, the lower surface, or the outer peripheral surface) of the balance wheel 42. The film body may be used as the adjusting section. In this case, it is possible to adjust the mass balance around the center axis O in the same manner by scraping off a part of the film body.

(Configuration of the Hairspring)

The hairspring 43 includes a hairspring main body 60, an inner end portion 61 of which is fixed to the balance staff 41 via the collet 46, and a spring weight 65 and an auxiliary weight 66 attached to the hairspring main body 60.

The hairspring main body 60 is a thin-plate spring made of a Nb—Mo alloy explained below and is formed in a swirl shape when viewed from the axial direction of the balance staff 41.

Specifically, the hairspring main body 60 is formed in a spiral shape extending along an Archimedes curve in a polar coordinate system having the center axis O as the origin. Consequently, the hairspring main body 60 is wound in a plural winding number such that windings are adjacent to one another at substantially equal intervals in the radial direction when viewed from the axial direction of the balance staff 41.

In the illustrated example, the hairspring main body 60 starts to be wound along the Archimedes curve with a connecting portion of the inner end portion 61 and the collet 46 as a start position of the winding and is formed at the winding number of fourteen. The illustrated example is one example. An appropriate winding number is selected according to a movement.

In the hairspring main body 60, a part of an outermost peripheral portion (a fourteenth winding) is formed as an arcuate section 64 separated to the radial direction outer side via a reforming section 63 and formed larger in a curvature radius than the other portions. An end portion of the arcuate section 64 is formed as an outer end portion 62 of the hairspring main body 60 and is fixed to a stud 67 attached via a not-shown stud support. Note that, in the figures, the stud 67 is indicated by an alternate long and two short dashes line.

[Composition of the Hairspring]

The hairspring 43 in this embodiment is made of a Nb—Mo alloy containing 5% or more and 14% or less of Mo in at %. More specifically, the hairspring 43 is made of a Nb—Mo alloy containing 5% or more and 14% or less of Mo in at % and made of a balance inevitable impurity and Nb.

The Nb—Mo alloy configuring the hairspring 43 preferably contains 9% or more and 13% or less of the Mo in at % and most preferably contains 9.5% or more and 12% or less of the Mo in at %.

The Nb—Mo alloy explained above can include any one of oxygen, nitrogen, hydrogen, and carbon as an inevitable impurity. An oxygen content as the inevitable impurity is preferably 0.6 at % or less and is more preferably 0.41 at % or less. A nitrogen content as the inevitable impurity is preferably 0.05 at % or less and is more preferably 0.033 at % or less. A hydrogen content as the inevitable impurity is preferably 0.7 at % or less and is more preferably 0.46 at % or less. A carbon content as the inevitable impurity is preferably 0.5 at % or less and is more preferably 0.39 at % or less.

In the Nb—Mo alloy configuring the hairspring 43 other than these impurities, a Nb base metal or a Mo base metal is used as a row material when the Nb—Mo alloy is melted. When these base metals are used as the row material, the base metals may contain 0.007 at % or less of iron (Fe), 0.05 at % or less of tantalum (Ta), 0.0005 at % or less of nickel (Ni), and 0.0008 at % or less of tungsten (W) as impurities deriving from row materials.

Further, the base metals may contain elements such as titanium (Ti), vanadium (V), chrome (Cr), zirconium (Zr), hafnium (Hf), platinum (Pt), palladium (Pd), and silicon (Si) other than the elements described above.

When a hairspring made of the Nb—Mo alloy having the composition explained above is manufactured, the alloy having the composition is melted and wire drawing is applied to obtained ingot to form a wire material having desirable thickness and a desirable sectional shape.

When the wire drawing is performed, it is preferable to apply intermediate heat treatment to the alloy. For example, it is possible to apply a necessary number of times of the wire drawing to the alloy, heat the alloy to approximately 950° C. to 1200° C. after the wire drawing, and finally obtain a wire material having a target sectional shape and a target wire diameter. After processing the alloy to the target wire diameter, after rolling the alloy to a target thickness, by forming the alloy in a target hairspring shape and applying heat treatment for heating the alloy for approximately several hours to a temperature range of approximately 700° C. to 1000° C., it is possible to form a hairspring with an improved <110>||{001} orientation degree of a deformation texture in a cross-sectional area. Note that, in the case of a heat treatment temperature of less than 700° C., a shape peculiarity of a spiral spring cannot be imparted to the hairspring.

For example, it is possible to apply a necessary number of times of the wire drawing working to a wire material having a diameter of approximately 1.0 mm until the wire material has a target wire diameter such as 0.5 mm, 0.3 mm, or 0.05 mm.

In the Nb—Mo alloy having the composition explained above, an alloy having a composition containing 5% or more and 14% or less of Mo in at % includes a deformation texture formed by plastic forming such as rolling and wire drawing.

As an example of the deformation texture, when the cross section of the hairspring 43 is observed, a region of a deformation texture having a <110>||{001} orientation degree preferably occupies 30% or more of the entire cross section. Naturally, the region of the deformation texture may be in a higher range or may be a texture occupying 100% of the entire cross section.

In the Nb—Mo alloy having the composition explained above, an average KAM value is preferably in a range of 1.0 to 4.0. The KAM value is a measurement value that can be obtained by a crystal orientation analysis based on an Electron Backscatter Diffraction image (EBSD) using a scanning electron microscope. For example, a range of 1000 μm×1000 μm is observed by a crystal orientation measurement device attached to the scanning electron microscope such that dozens of crystal grains are included in a measurement region of a sample cross section. In this observation range, it is possible to measure KAM values at multiple locations, which are misorientations among measurement points in the same crystal grains, and calculate an average KAM value. The average KAM value can be considered an average value of orientation differences between pixels of attention and adjacent pixels in an observation image.

The Nb—Mo alloy having the composition explained above has a low and stable temperature coefficient of a rate.

A first temperature coefficient of a rate (C1) of the hairspring made of the Nb—Mo alloy having the composition explained above can be calculated by a formula $C1=(rate_{38}-rate_{8})/(38-8)$ [s/d/° C.]. This value is preferably ±2.0 or less and is more preferably ±0.5 or less.

A second temperature coefficient of a rate (C2) of the hairspring made of the Nb—Mo alloy having the composition explained above can be calculated by a formula $C2=(rate_{38}-rate_{23})/(38-23)$ [s/d/° C.]. This value is preferably ±2.0 or less and is more preferably ±0.5 or less.

A third temperature coefficient of a rate (C3) of the hairspring made of the Nb—Mo alloy having the composition explained above can be calculated by a formula $C3=(rate_{23}-rate_{8})/(23-8)$ [s/d/° C.]. This value is preferably ±2.0 or less and is more preferably ±0.5 or less.

Figure 4:
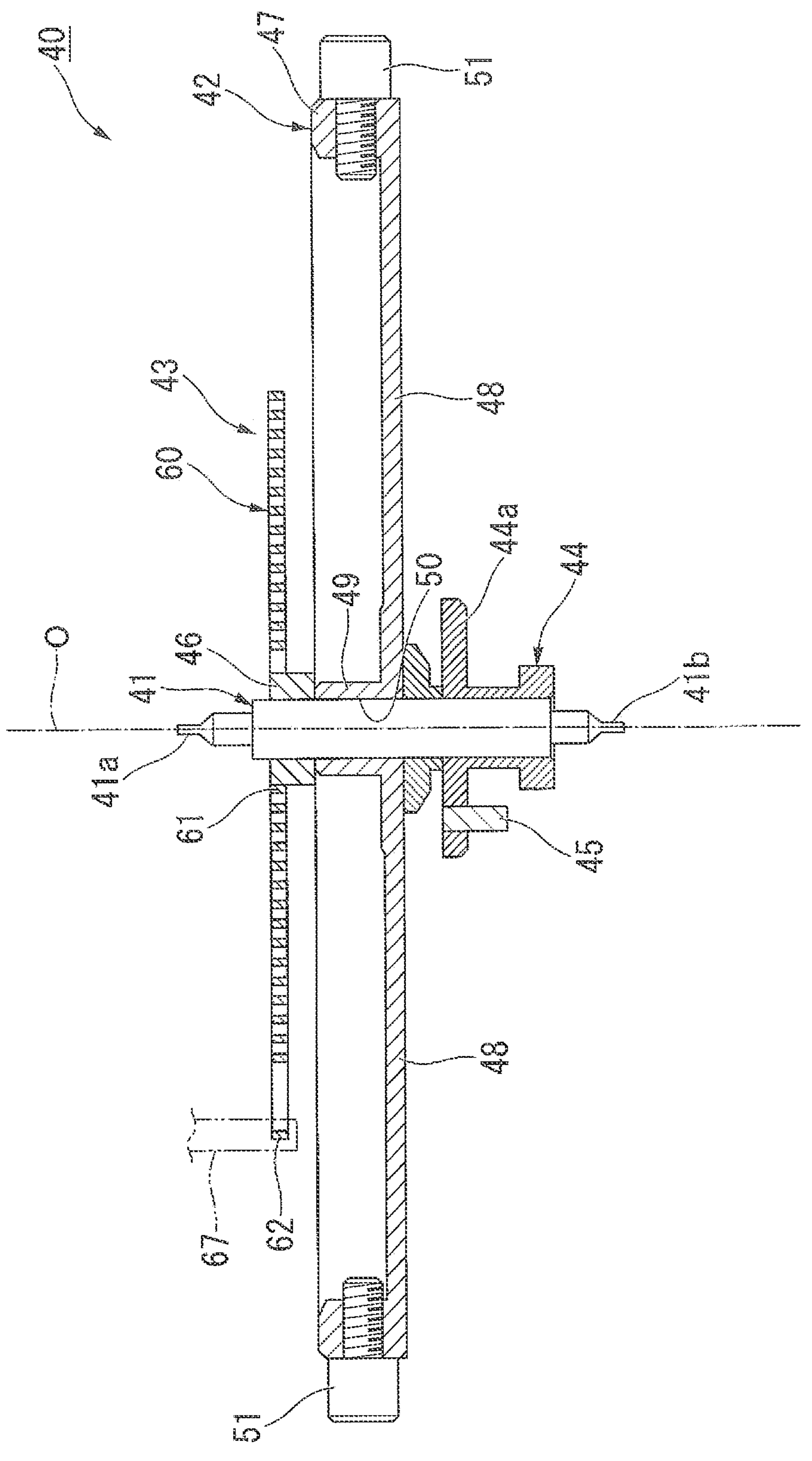
FIG. 4 is a sectional view of the balance with hairspring.
Figure 5:
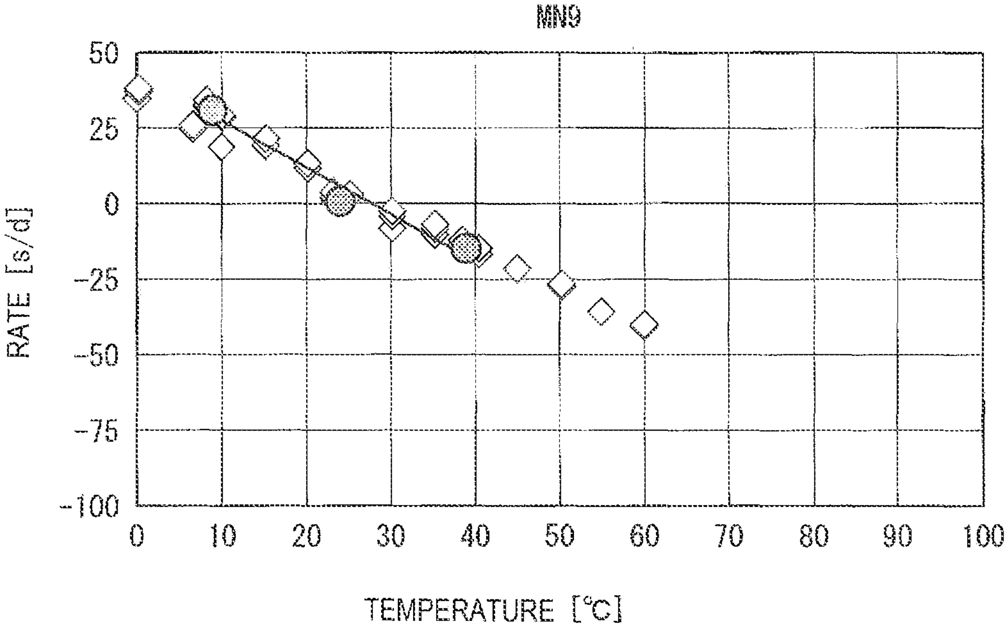
FIG. 5 is a graph showing a temperature coefficient of a rate in a hairspring made of a Nb-9 at % Mo alloy.

FIG. 5 shows a temperature characteristic of a rate of the hairspring shown in FIG. 3 and FIG. 4 made of the Nb-9 at % Mo alloy.

Figure 6:
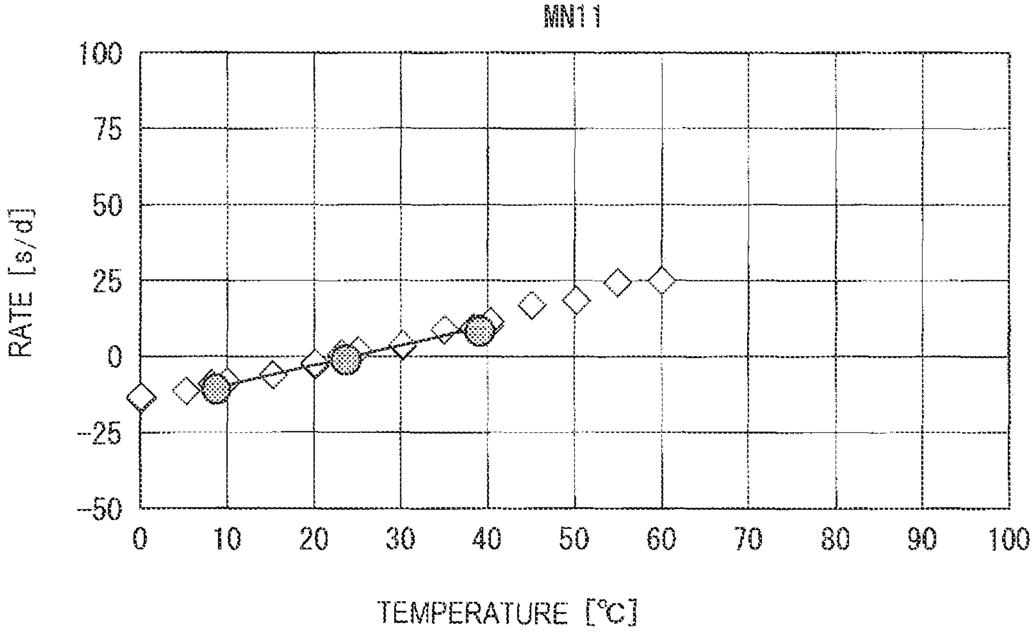
FIG. 6 is a graph showing a temperature coefficient of a rate in a hairspring made of a Nb-11 at % Mo alloy.

FIG. 6 shows a temperature characteristic of a rate of the hairspring shown in FIG. 3 and FIG. 4 made of the Nb-11 at % Mo alloy.

Figure 7:
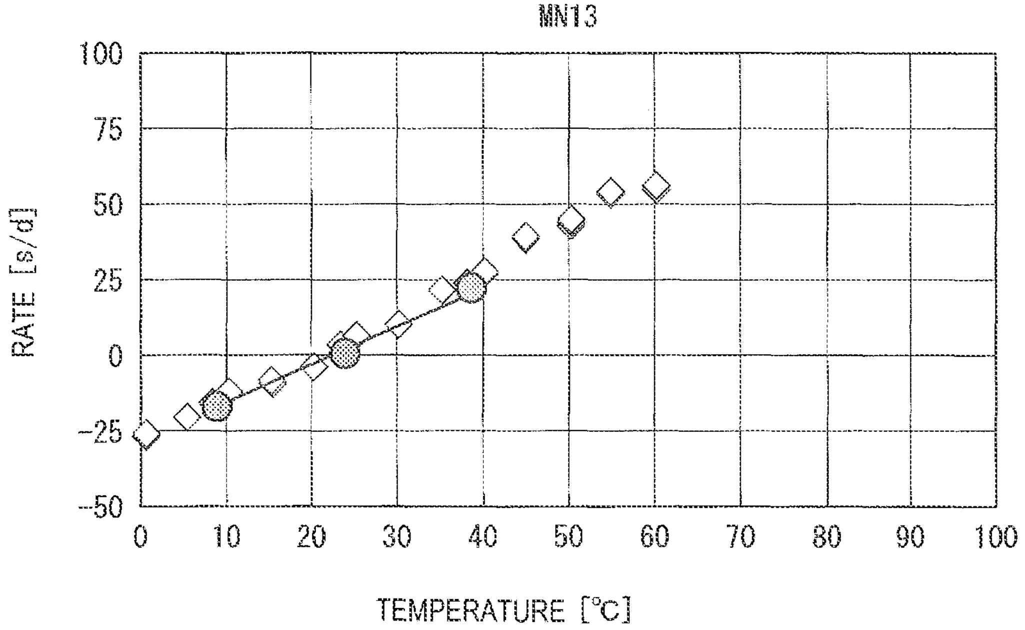
FIG. 7 is a graph showing a temperature coefficient of a rate in a hairspring made of a Nb-13 at % Mo alloy.

FIG. 7 shows a temperature characteristic of a rate of the hairspring shown in FIG. 3 and FIG. 4 made of the Nb-13 at % Mo alloy.

In the temperature characteristics, C1 and C2 can be calculated as shown in Table 1 below from relations shown in FIG. 5, FIG. 6, and FIG. 7 and the calculation formula described above. Calculation results of C1 and C2 of the Nb-10 at % Mo alloy calculated by the same method are also described in Table 1 below:

TABLE 1

| | C1 [s/d/° C.] | C2 [s/d/° C.] |
|---|---|---|
| Nb-9 at % Mo alloy | −1.49 | −1.68 |
| Nb-10 at % Mo alloy | 0.34 | 0.49 |
| Nb-11 at % Mo alloy | 0.62 | 0.65 |
| Nb-13 at % Mo alloy | 1.08 | 1.29 |

Figure 8:
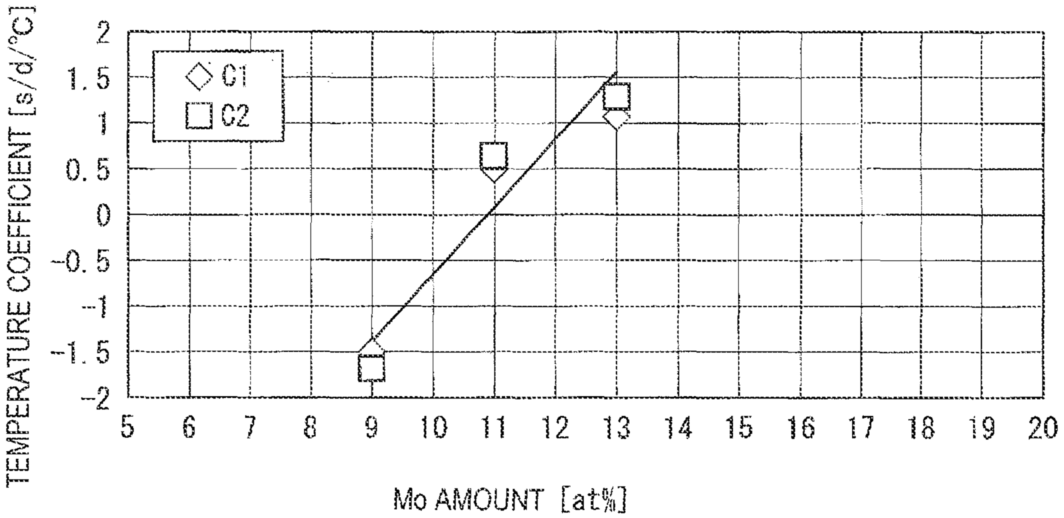
FIG. 8 is a graph showing a correlation with a Mo content about temperature coefficients of rates (C1, C2) in a hairspring made of a Nb—Mo alloy.

FIG. 8 shows Mo concentration dependency of the temperature coefficients of the rates (C1, C2) in the Nb—Mo alloys having the compositions (Mo contents: 9 at %, 11 at %, 13 at %) calculated earlier from the relations shown in FIG. 5 to FIG. 7.

As it is evident from Table 1 and a result shown in FIG. 8, with the Nb—Mo alloys containing 9 to 13 at % of Mo, C1 and C2 can be set to ±2.0 or less.

Figure 9:
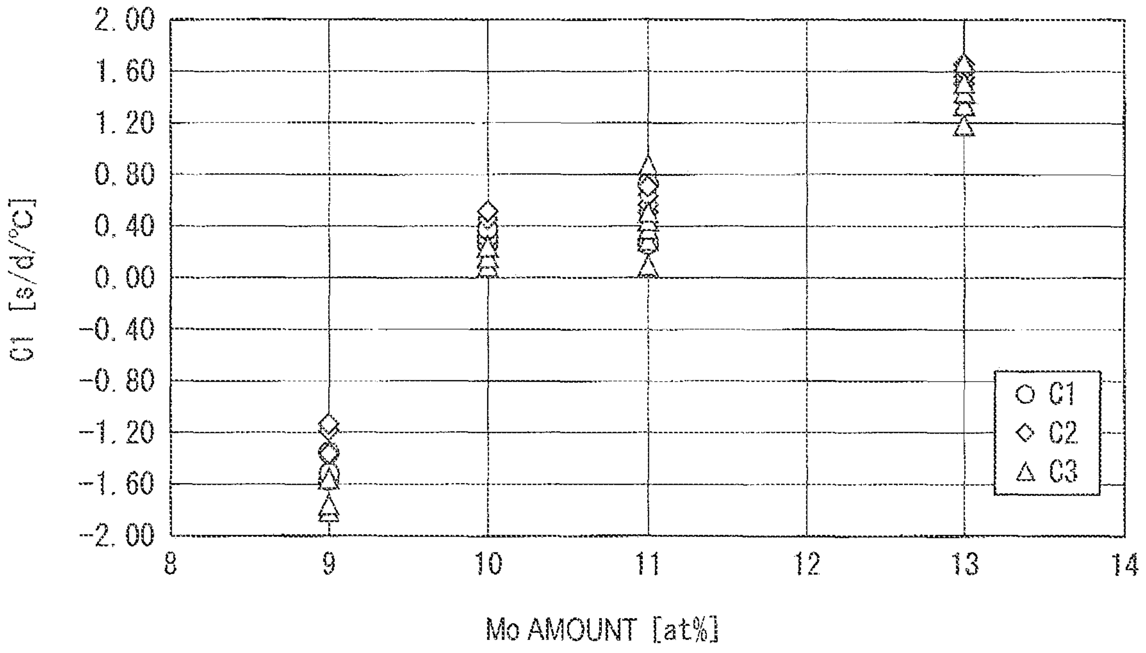
FIG. 9 is a graph showing a correlation with a Mo content about a first temperature coefficients of a rate (C1), a second temperature coefficients of a rate (C2), and a third temperature coefficients of a rate (C3) in the hairspring made of the Nb—Mo alloy.

FIG. 9 shows Mo concentration dependency of the temperature coefficients of the rates (C1, C2, C3) calculated as explained above from test results of the samples having the compositions shown in FIG. 5 to FIG. 7 and samples having other compositions.

It is seen from a result shown in FIG. 9 that, since the Nb—Mo alloy configuring the hairspring 43 contains 9 at % or more and 13 at % or less of Mo, the temperature coefficients of the rates can be suppressed to within a range of ±2.0 [s/d/° C.]. Further, it was also found that, since the Nb—Mo alloy contains 9.5 at % or more and 12.5 at % or less of Mo, the temperature coefficients of the rates can be suppressed to within a range of ±0.8 [s/d/° C.].

When only C1 and C2 are taken into account, it was also found that, since the Nb—Mo alloy contains 9.5 at % or more and 12.5 at % or less of Mo, the temperature coefficients C1 and C2 can be suppressed to within a range of ±0.5 [s/d/° C.].

Figure 10:
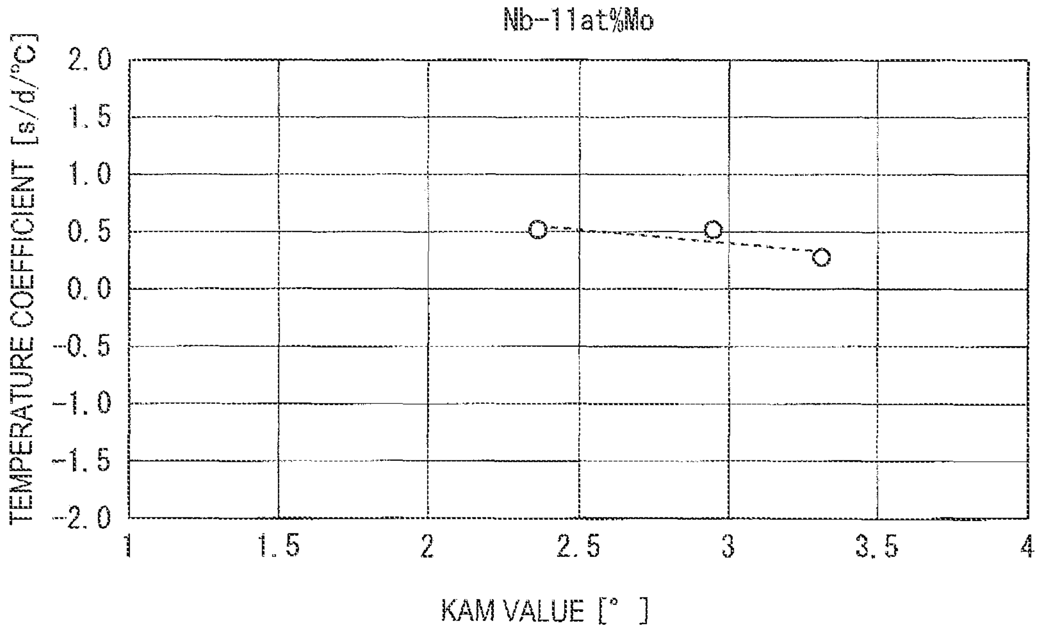
FIG. 10 is a graph showing a relation between a temperature coefficient of a rate and an average KAM value in the hairspring made of the Nb-11 at % Mo alloy.

FIG. 10 shows a result obtained by checking a relation between a temperature coefficient of a rate and an average KAM value in the Nb-11 at % Mo alloy.

It is seen from a result shown in FIG. 10 that, when the average KAM value is adjusted, the temperature coefficient of the rate can also be adjusted.

Figure 11:
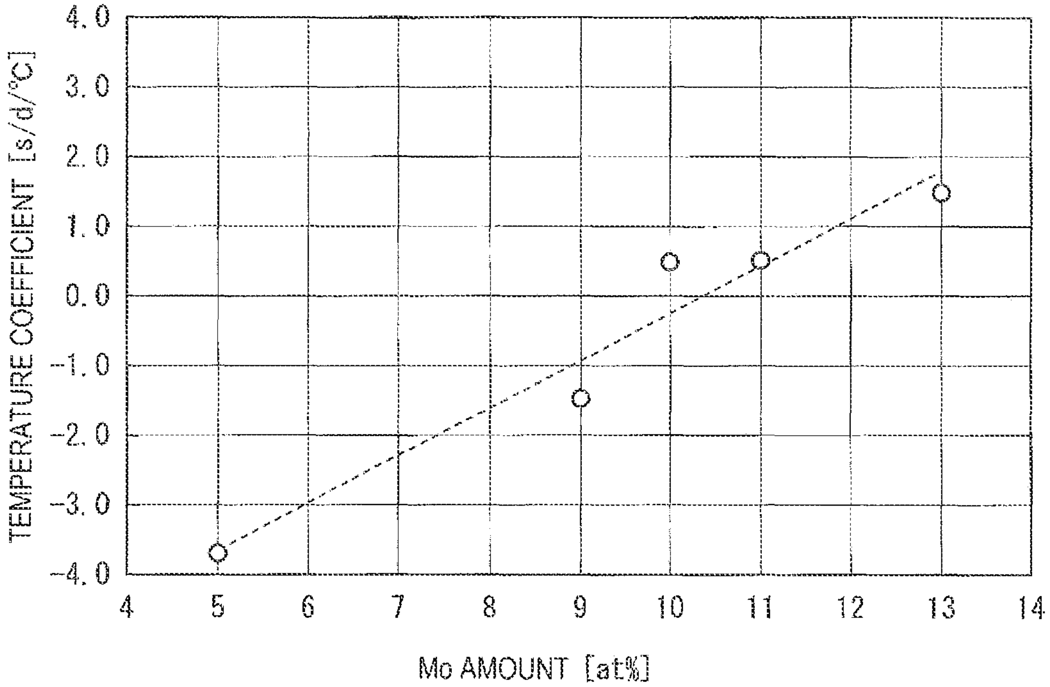
FIG. 11 is a graph showing a relation between a temperature coefficient of a rate and a Mo amount in the hairspring made of the Nb—Mo alloy.

FIG. 11 is a graph collectively showing results obtained by calculating Mo concentration dependency of a temperature coefficient of a rate in a range of an Mo content of 5 to 13 at %. It is seen that, concerning the Nb—Mo alloy, the temperature coefficient of the rate can realize a range of ±4.0 or less in the range of the Mo content of 5 to 13 at %.

Figure 12:
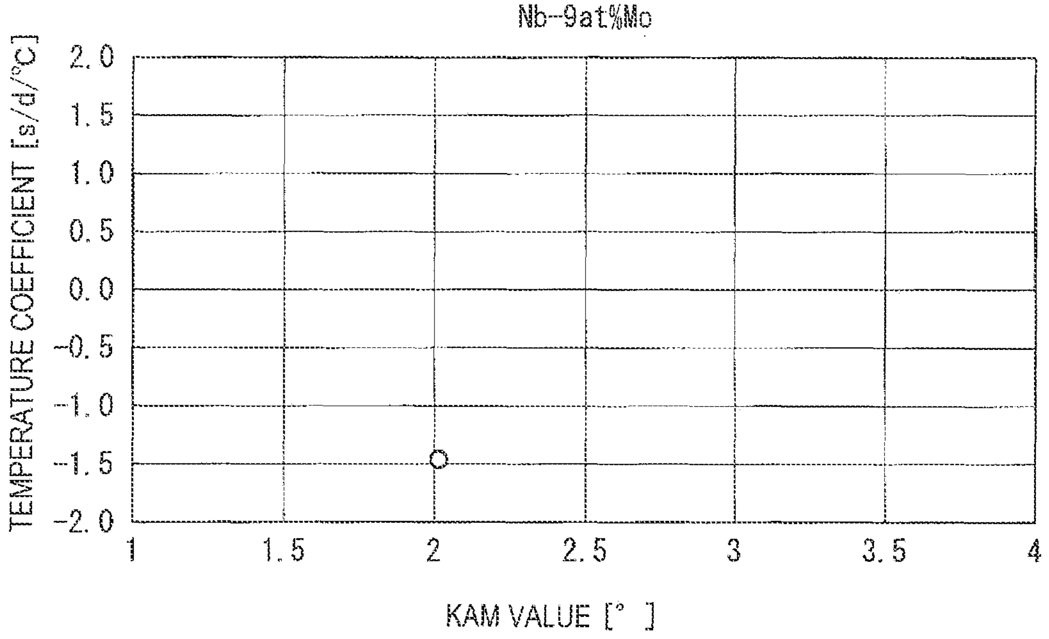
FIG. 12 is a graph showing a relation between a temperature coefficient of a rate and an average KAM value in the hairspring made of the Nb-9 at % Mo alloy.

FIG. 12 shows a relation between a temperature coefficient of a rate and an average KAM value in the hairspring made of the Nb-9 at % Mo alloy.

Figure 13:
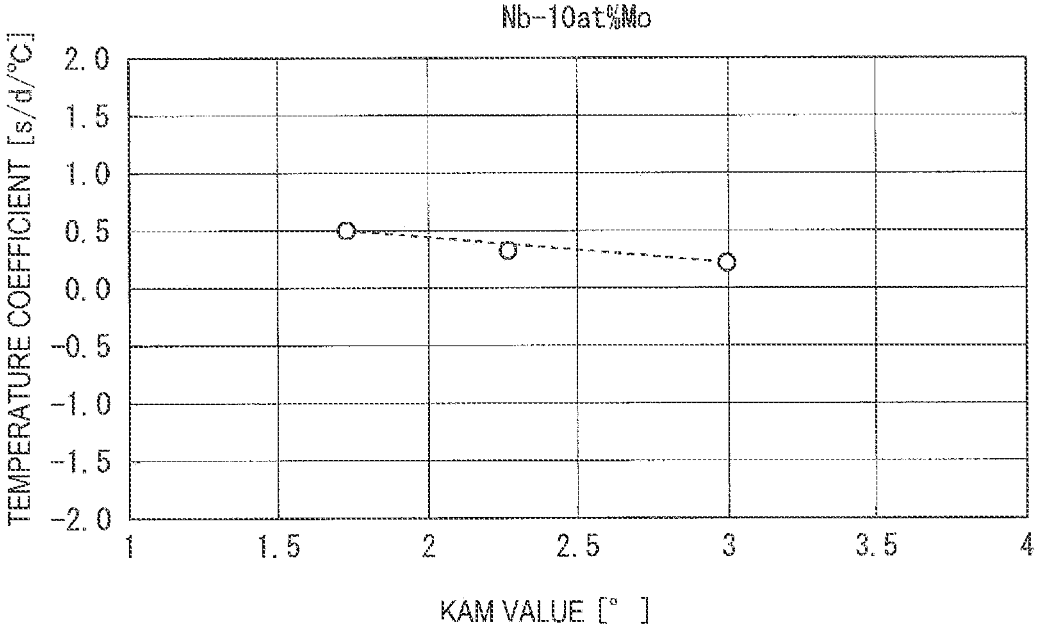
FIG. 13 is a graph showing a relation between a temperature coefficient of a rate and an average KAM value in a hairspring made of a Nb-10 at % Mo alloy.
Figure 14:
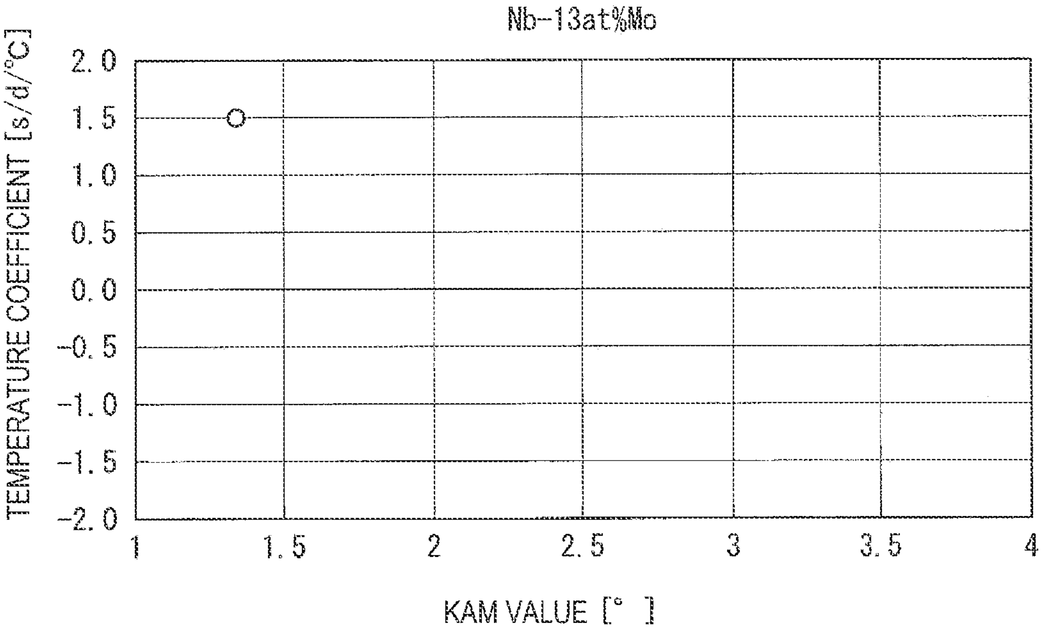
FIG. 14 is a graph showing a relation between a temperature coefficient of a rate and an average KAM value in a hairspring made of a Nb-13 at % Mo alloy.

FIG. 13 shows a relation between a temperature coefficient of a rate and an average KAM value in the hairspring made of the Nb-10 at % Mo alloy. FIG. 14 shows a relation between a temperature coefficient of a rate and an average KAM value in the hairspring made of the Nb-13 at % Mo alloy.

When viewing any of the graphs shown in FIG. 10 to FIG. 14, it is seen that, in the Nb—Mo alloys, as in the Nb-11 at % Mo alloy explained above, it is seen that the temperature coefficient of the rate can also be adjusted when the average KAM value is adjusted.

Figure 15:
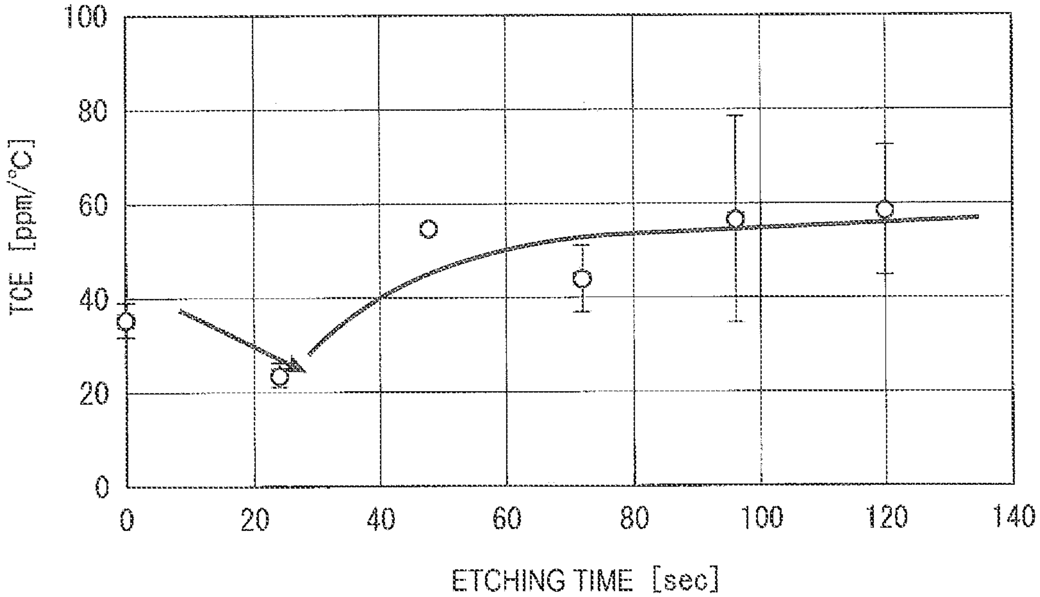
FIG. 15 is a graph showing a relation between a temperature coefficient of elasticity of the Nb—Mo alloy and an etching time of a sample.

FIG. 15 shows a result obtained by measuring, about hairsprings made of the Nb-11 at % Mo alloy having cross-sectional shapes shown in FIG. 17 to FIG. 20, a relation between an etching time by a fluonitric acid solution and TCE.

Figure 17:
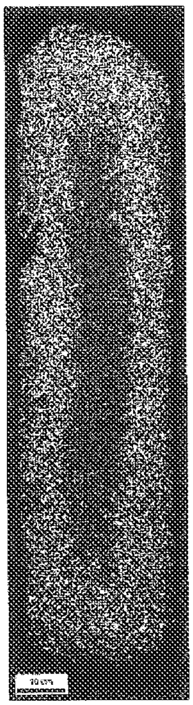
FIG. 17 is a texture analysis photograph showing a region indicating a <110>||{001} orientation in a cross section of the hairspring made of the Nb—Mo alloy.
Figure 18:
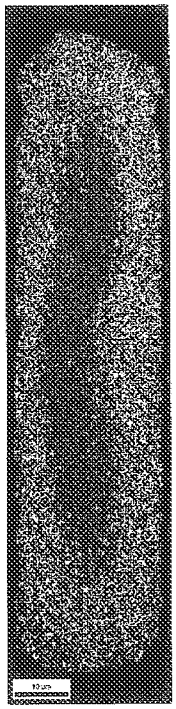
FIG. 18 is a texture analysis photograph showing a region indicating the <110>||{001} orientation in the cross section after the outer peripheral portion of the hairspring shown in FIG. 17 is etched for twenty-four seconds.
Figure 19:
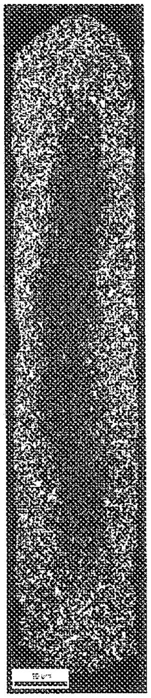
FIG. 19 is a texture analysis photograph showing a region indicating the <110>||{001} orientation in a cross section after the outer peripheral portion of a hairspring sample obtained in an example is etched for forty-eight seconds.

The hairspring having the sectional shape shown in FIG. 17 shows a cross section in a state the hairspring is not etched. The hairspring having the sectional shape shown in FIG. 18 shows a cross section after etching for twenty-four seconds. The hairspring having the sectional shape shown in FIG. 19 shows a cross section after etching for forty-eight seconds. The hairspring having the sectional shape shown in FIG. 20 shows a cross section after etching for seventy-two seconds.

Figure 20:
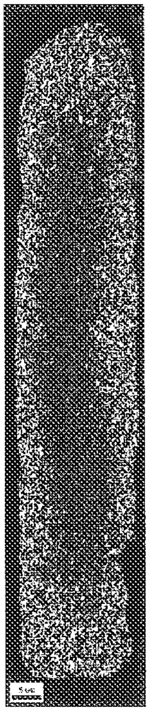
FIG. 20 is a texture analysis photograph showing a region indicating the <110>||{001} orientation in the cross section after the outer peripheral portion of the hairspring sample obtained in the example is etched for seventy-two seconds.

Note that the hairsprings shown in FIG. 18 to FIG. 20 show sample cross sections of the hairsprings, respective in the case in which the entire hairsprings are immersed in etching liquid and the outer peripheries are gradually removed to machine the hairsprings to be thin. As shown in FIG. 15, low TCE are obtained in all samples.

FIG. 17 to FIG. 20 show results obtained by checking, when the cross sections of the hairsprings are observed by an EBSD analysis, to which degrees a deformation texture (a region oriented by <110>||{001}) is generated in the cross sections.

As shown in FIG. 17, a dark color vertically long region is shown in the center region of the hairspring. The region is a region including a deformation texture and having a <110>||{001} orientation degree in a cross section. It is seen that, according to progress of etching, an occupied area by the deformation texture can be gradually increased by gradually dissolving the outer periphery side of the hairspring.

Figure 16:
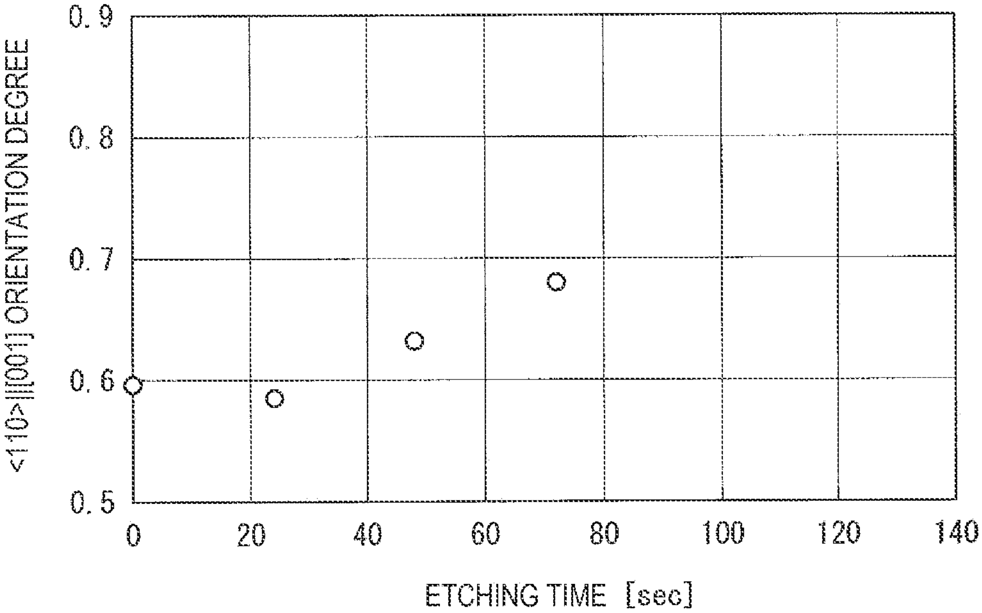
FIG. 16 is a graph showing a relation between a <110>||{001} orientation degree and an etching time in the hairspring made of the Nb—Mo alloy.

FIG. 16 shows an area ratio of the region having the <110>||{001} orientation degree with respect to the entire area of the cross section in the hairspring samples shown in FIG. 17 to FIG. 20, respectively.

As shown in FIG. 16, in the sample shown in FIG. 17, 60% of the entire sectional area is the deformation texture, in the sample shown in FIG. 18, 58% of the entire sectional area is the deformation texture, in the sample shown in FIG. 19, 63% of the entire sectional area is the deformation texture, and, in the sample shown in FIG. 20, 68% of the entire sectional area is the deformation texture.

It is seen that the area ratio of the deformation texture with respect to the entire cross-sectional area of the hairspring can be adjusted by the etching in this way.

Figure 21:
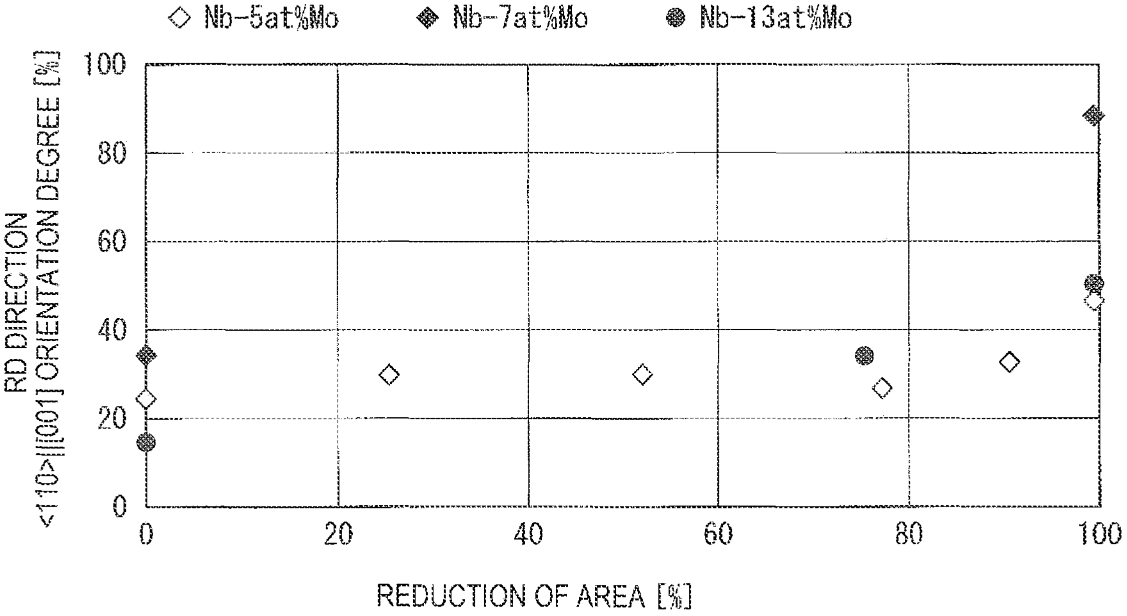
FIG. 21 is a graph showing a relation between the <110>||{001} orientation degree and a processing rate of the hairspring made of the Nb—Mo alloy.

FIG. 21 shows a result of calculating a processing rate and a <110>||{001} orientation degree in an RD direction (a rolling direction) when a Nb-5 at % Mo alloy (NM5), a Nb-7 at % Mo alloy (MN7), and a Nb-13 at % Mo alloy (MN13) are respectively subjected to wire drawing.

In FIG. 21, the <110>||{001} orientation degree in the RD direction does not greatly change up to approximately the processing rate of 90% but the <110>||{001} orientation degree in the RD direction is substantially improved when the processing rate exceeds 90%. In particular, the <110>||{001} orientation degree in the RD direction shows 45 to 90% in a range of the processing rate of 95 to 99%.

It is seen from the result shown in FIG. 21 that, when the Nb—Mo alloy is plastically formed, if the processing rate is set in a range of 95 to 99%, the <110>||{001} orientation degree in the RD direction in a hairspring can be adjusted to 45 to 90%.

That is, when the Nb—Mo alloy is plastically formed, it is possible to adjust an orientation degree of a deformation texture by setting the processing rate to 95 to 99% and it is possible to set a composition ratio corresponding to a residual strain amount introduced according to the processing rate.

It is seen from the above that, with the alloy explained above, it is possible to provide a hairspring that is capable of adjusting a TCE considering actual processing and makes it possible to adjust a KAM value to a desirable range and adjust the TCE to a TCE in a desirable range through optimization of a deformation texture and a residual strain amount.

<Configuration of a Timepiece in a Second Embodiment>

A basic configuration of a complete in a timepiece in a second embodiment is equivalent to the complete of the timepiece in the first embodiment explained above.

Figure 22:
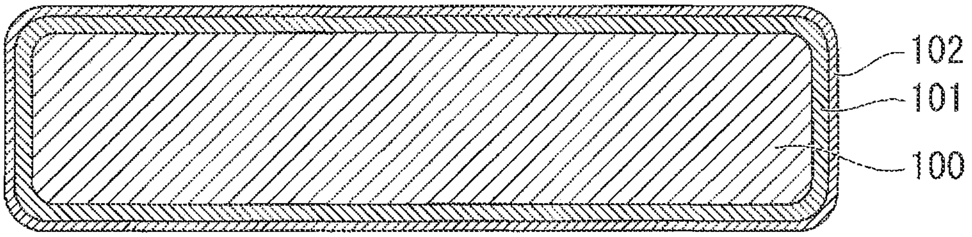
FIG. 22 is a cross-sectional view of a hairspring according to a second embodiment including an oxide coating film layer.

The configuration in the second embodiment is different from the configuration in the first embodiment in a configuration of a hairspring. The hairspring in the second embodiment includes, as shown in FIG. 22, a base material 100, a first oxide coating film layer 101 that covers the outer peripheral surface of the base material 100, and a second oxide coating film layer 102 that covers the outer peripheral surface of the first oxide coating film layer 101.

The base material 100 is made of the Nb—Mo alloy explained above. The first oxide coating film layer 101 includes Mo and Nb or is made of Mo, Nb, and O. For example, the first oxide coating film layer 101 may be configured from a Mo oxide and a Nb oxide. Alternatively, the first oxide coating film layer 101 may be configured from an oxide coating film layer in which the Mo oxide is mixed in a Nb oxide layer.

The first oxide coating film layer 101 is made of a film of a metal oxide. As an example, the first oxide coating film layer 101 is formed by anodizing the Nb—Mo alloy or thermally oxidizing the Nb—Mo alloy under an oxygen mixed gas atmosphere. The coating film layer 101 is made of a mixture of a Nb oxide film and a Mo oxide film. An electrolytic solution component is also likely to be mixed in the first oxide coating film layer 101. For example, when the Nb—Mo alloy is anodized in a phosphoric aqueous solution, a phosphoric ion and the like are contained in the coating film layer 101.

The second oxide coating film layer 102 is made of a film of a metal oxide. The second oxide coating film layer 102 is formed by anodizing the Nb—Mo alloy or thermally oxidizing the Nb—Mo alloy under an oxygen mixed gas atmosphere. The second oxide coating film layer 102 is made of a Nb oxide film. An electrolytic solution component is also likely to be mixed in the second coating film layer 102. For example, when the Nb—Mo alloy is anodized in a phosphoric aqueous solution, a phosphoric ion and the like are contained in the second coating film layer 102.

As an example, a boundary between the first oxide coating film layer 101 and the second oxide coating film layer 102 may be clearly divided. The first oxide coating film layer 101 and the second oxide coating film layer 102 may be configured to be continuous while having a concentration gradient with a gradation of contained elements formed in the boundary between the respective layers.

A total film thickness of the thicknesses of the first coating film layer 101 and the second coating film layer 102 is, for example, 10 to 300 nm. With the total film thickness in the range described above, it is possible to suppress a change with time of a rate due to natural oxidation of the hairspring. Even in the range described above, with an oxide coating film layer having a total film thickness of 140 to 250 nm, it is possible to obtain an oxide coating film layer that assumes an interference color having high decorativeness.

As a method of forming an oxide coating film layer, an anodic oxidation method or a thermal oxidation method under an oxygen mixed gas atmosphere can be selected.

[Formation of the Oxide Coating Film Layer by the Anodic Oxidation Method]

An example of the anodic oxidation method is a method of immersing a hairspring made of a Nb—Mo alloy in a 1% phosphoric aqueous solution and applying a voltage to the hairspring with a weak current.

As an example, the applied voltage is slowly boosted up to approximately 65 V and, when the applied voltage reaches approximately 65 V, treatment is continued until a current amount does not change. An oxide coating film layer of approximately 160 nm can be generated on the hairspring by this treatment. The hairspring with the oxide coating film layer assumes a bluish purple color.

An electrolytic solution for the anodization may be sulfuric acid, ammonia solution, or the like besides the phosphoric acid.

The applied voltage may be any value. However, it is desirable to consider a balance of a film thickness, aesthetics, and work safety. Above all, it is desirable to apply the anodic oxidation treatment at an applied voltage of 30 to 35 V or 60 V to 75 V in order to assume a tint considered to have a high-grade sense in a mechanical wristwatch, that is, an interference color of blue and purple.

In a sample manufactured in the same composition, at the same processing rate, and by the same heat treatment, a barrier effect of oxygen in the air is larger as the oxide film thickness is larger, that is, the applied voltage is higher. Therefore, an effect of suppressing a change with time of a rate is larger. In addition, a TCE is smaller as the oxide film thickness is larger. A reason why the TCE is smaller is as explained below.

Figure 23:
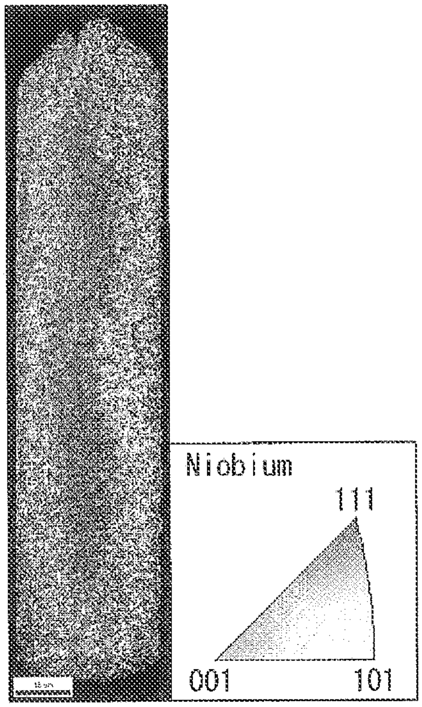
FIG. 23 is a texture analysis photograph showing a region indicating a <110>||{001} orientation in a cross section after the outer peripheral portion of a hairspring sample including an oxide coating film layer obtained in an example is etched.

In an RD cross section of the hairspring made of the Nb—Mo alloy, as indicated by an IPF map by an SEM-EBSD analysis shown in FIG. 23, a crystal orientation is oriented to <110> in the center and the outermost surface and oriented at random in an intermediate portion between the center and the outermost surface. In a temperature range used in a timepiece, the TCE is a negative value in most metals and alloys.

On the other hand, in the Nb—Mo alloy, the TCE is changed to a positive value by increasing a <110>||{001} orientation degree of a cross section. Therefore, the TCE can be reduced the <110>||{001} orientation degree of the outermost surface by the anodization.

Accordingly, in order to simultaneously achieve three points of suppression of the change with time of the rate, control of the TCE, and improvement of the aesthetics, it is desirable to set conditions of a composition of the Nb—Mo alloy, a processing method and a processing rate, and a thermal treatment temperature for spiral shape fixing such that the TCE increases in a state without an oxide coating film layer, form the hairspring, and, thereafter, perform the anodic oxidation treatment at approximately 65 V.

[Formation of the Oxide Coating Film Layer by the Thermal Oxidation Method]

To manufacture, with the thermal oxidation method, the hairspring made of the Nb—Mo alloy including the oxide coating film layer, heat treatment at 300° C. or more is performed in a muffle furnace. A thermal oxidation film can be generated on the hairspring by this method.

The thickness of the oxide coating film layer depends on temperature and time of the heat treatment. For example, when the treatment is performed at 350° C. for twenty minutes in the air, an oxide coating film layer of approximately 50 nm can be generated. The hairspring with the oxide coating film layer assumes an interference color of blue.

An atmospheric gas of the heat treatment only has to be oxygen or a mixed gas that contains oxygen and does not corrode an alloy. Examples of the atmospheric gas include the air or an oxygen-rare gas (Ar or the like) mixed gas.

Heat treatment temperature and time for generating an oxide coating film layer with the thermal oxidation method only have to be determined according to a film thickness of an oxide coating film layer desired to be formed. The heat treatment only has to be performed in a temperature range of 300 to 700° C. and a time range of 1 minute to 12 hours.

Effects obtained by the thermal oxidation method are the same as the effects in the case of the anodic oxidation. It is possible to control the TCE and improve aesthetics by an interference color.

Figure 24:
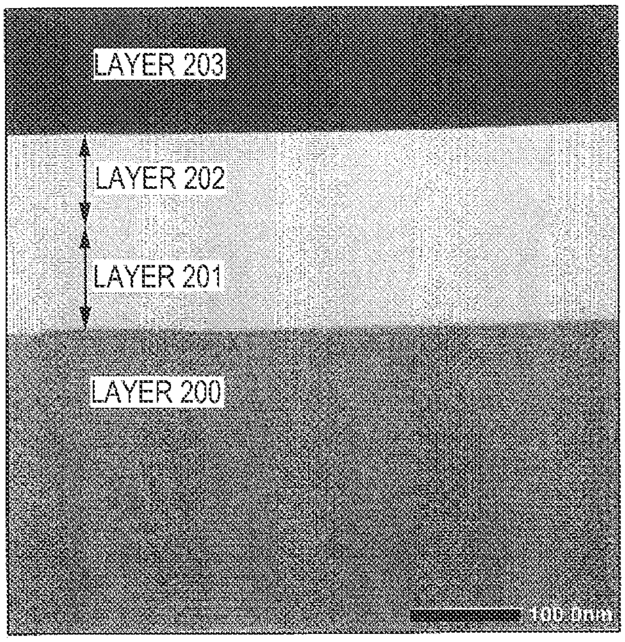
FIG. 24 is a STEM bright field image showing a cross section of a hairspring including the oxide coating film layer obtained in the example.

A difference between the first coating film layer 101 and the second coating film layer 102 can be discriminated from a bright field image of a scanning transmission electron microscopy (STEM) shown in FIG. 24.

The bright field image shown in FIG. 24 includes four layers of a layer 200, a layer 201, a layer 202, and a layer 203.

The layer 200 is the hairspring made of the Nb—Mo alloy, which is a base material, and is equivalent to the base material 100 in FIG. 22. The layers 201 and 202 are respectively oxide coating film layers equivalent to the first coating film layer 101 and the second coating film layer 102. The layer 203 is a Au protective film coated for STEM observation.

Since electrons transmitted through a sample are detected in the STEM bright field image, a lighter element is imaged more brightly and a heavier element is imaged more darkly. When the layer 201 and the layer 202 are compared, since the layer 201 is slightly darker, it is seen that a heavier element is included in the layer 201 than in the layer 202. Further, an element can be specified by combining an energy dispersive X-ray spectroscopy (EDX). It was found that Nb, Mo, and O are included in the layer 201 (the first coating film layer 101) and Nb and O are included in the layer 202 (the second coating film layer).

A result of STEM is generated in the same manner irrespective of whether the generation method for the oxide coating film layer is the anodization or the thermal oxidation method.

[Effect of Suppressing a Rate Change with Time]

Figure 25:
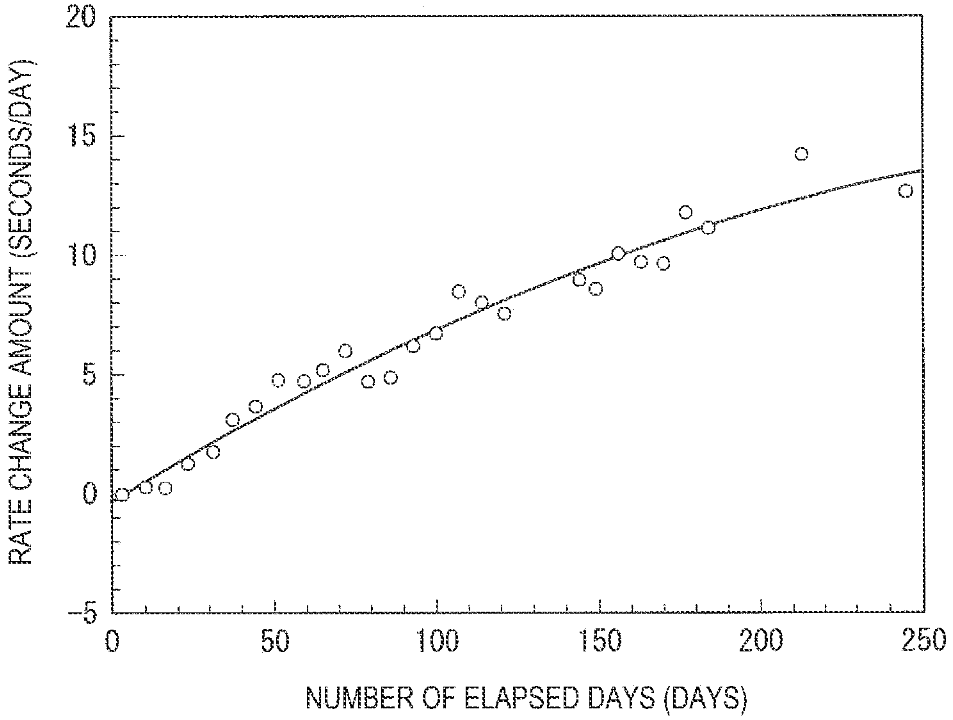
FIG. 25 is a graph showing an example of a change with time of a rate in a hairspring not including the oxide coating film layer.

In a mechanical timepiece movement using a hairspring made of an untreated Nb—Mo alloy, as shown in FIG. 25, a rate advanced according to elapse of time (the number of elapsed days). Accuracy disorder of approximately 13 seconds/day occurred after 250 days.

Figure 26:
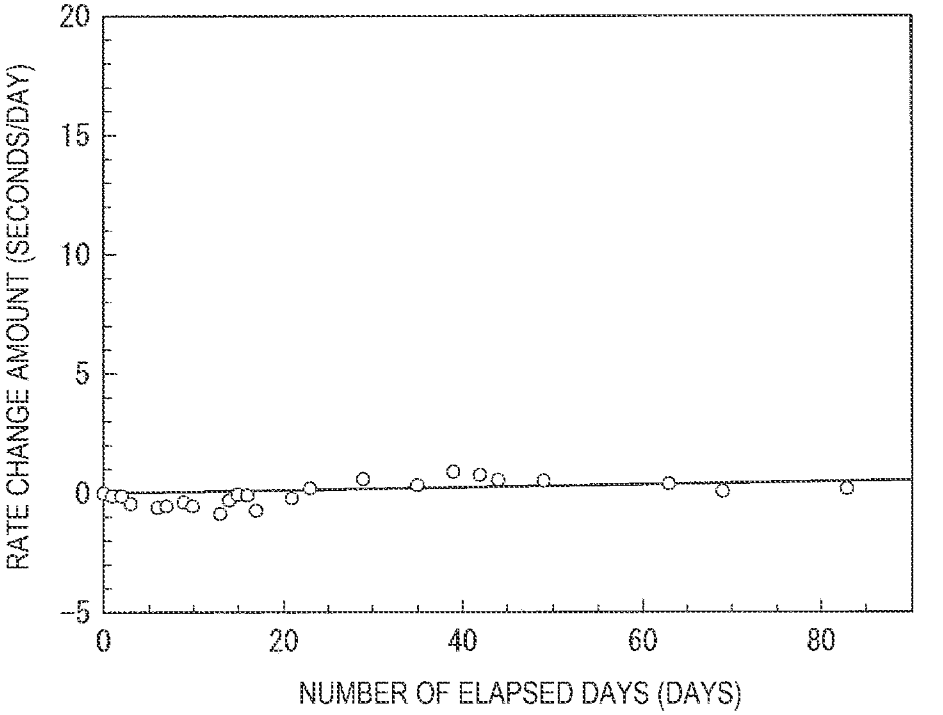
FIG. 26 is a graph showing an example of a change with time of a rate in the hairspring including the oxide coating film layer.

On the other hand, in a mechanical timepiece movement using a hairspring made of a Nb—Mo alloy including an oxide coating film layer by the anodic oxidation method having a film thickness of 160 nm, as shown in FIG. 26, accuracy disorder due to elapse of time hardly occurred after eighty days.

Therefore, it was found that, by forming the first coating film layer 101 and the second coating film layer 102 on the Nb—Mo alloy configuring the hairspring, it is possible to provide a hairspring in which a change in a rate hardly occurs over time. It was found that it is possible to provide a timepiece movement and a timepiece in which a change in a rate hardly occurs including the hairspring explained above.

What is claimed is:

1. A hairspring, comprising:

a base material, comprising a Nb—Mo alloy containing 5% or more and 14% or less of Mo in atomic percentage (at %;

a first oxide coating film layer covering an outer peripheral surface of the base material, the first oxide coating film layer comprising Nb, Mo, and O; and a second oxide coating film layer covering an outer peripheral surface of the first oxide coating film layer, the second oxide coating film layer comprising Nb and O.

2. The hairspring according to claim 1, wherein the hairspring has a deformation texture, and a region having a <110>||{001} orientation degree in a transverse cross section is 30% or more of an entire transverse cross-sectional area.

3. The hairspring according to claim 2, wherein an average KAM value of the Nb—Mo alloy is 1.0 to 4.0.

4. The hairspring according to claim 1, wherein an average Kernel Average Misorientation (KAM) value of the Nb—Mo alloy is 1.0 to 4.0.

5. A timepiece movement, comprising the hairspring according to claim 1, a balance staff, and a balance wheel.

6. A timepiece comprising the timepiece movement according to claim 5.

7. A hairspring, comprising:

a base material, consisting of a Nb—Mo alloy containing 5% or more and 14% or less of Mo in at %, impurities, and Nb;

a first oxide coating film layer covering an outer peripheral surface of the base material, the first oxide coating film layer comprising Nb, Mo, and O; and a second oxide coating film layer covering an outer peripheral surface of the first oxide coating film layer, the second oxide coating film layer comprising Nb and O.

8. The hairspring according to claim 7, wherein the hairspring has a deformation texture, and a region having a <110>||{001} orientation degree in a transverse cross section is 30% or more of an entire transverse cross-sectional area.

9. The hairspring according to claim 8, wherein an average KAM value of the Nb—Mo alloy is 1.0 to 4.0.

10. The hairspring according to claim 7, wherein an average KAM value of the Nb—Mo alloy is 1.0 to 4.0.

11. A timepiece movement, comprising the hairspring according to claim 7, a balance staff, and a balance wheel.

12. A timepiece comprising the timepiece movement according to claim 11.

* * * * *